(12) United States Patent
Den

(10) Patent No.: US 11,166,063 B1
(45) Date of Patent: Nov. 2, 2021

(54) ENHANCED SET-TOP BOX CONTROL

(71) Applicant: Rovi Guides, Inc., San Jose, CA (US)

(72) Inventor: Keiichi Den, Tokyo (JP)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/115,332

(22) Filed: Dec. 8, 2020

(51) Int. Cl.
| | |
|---|---|
| H04N 21/422 | (2011.01) |
| H04N 21/442 | (2011.01) |
| G06F 3/16 | (2006.01) |
| H04N 21/482 | (2011.01) |
| H04N 21/466 | (2011.01) |

(52) U.S. Cl.
CPC ....... *H04N 21/42203* (2013.01); *G06F 3/167* (2013.01); *H04N 21/42221* (2013.01); *H04N 21/44231* (2013.01); *H04N 21/4668* (2013.01); *H04N 21/4828* (2013.01)

(58) Field of Classification Search
CPC ....... H04N 21/42203; H04N 21/44231; H04N 21/4828; H04N 21/42221; H04N 21/4668; G06F 3/167
See application file for complete search history.

(56) References Cited

U.S. PATENT DOCUMENTS

| | | | |
|---|---|---|---|
| 2017/0090864 A1* | 3/2017 | Jorgovanovic | G10L 21/0332 |
| 2017/0236512 A1* | 8/2017 | Williams | H04R 3/12 |
| | | | 381/79 |
| 2018/0285065 A1* | 10/2018 | Jeong | G06F 3/167 |
| 2019/0051296 A1* | 2/2019 | Echols | G06F 40/40 |
| 2019/0251960 A1* | 8/2019 | Maker | G10L 15/08 |
| 2019/0371324 A1* | 12/2019 | Powell | G10L 15/22 |
| 2020/0135191 A1* | 4/2020 | Nourbakhsh | G06F 3/167 |
| 2021/0065719 A1* | 3/2021 | Wang | G06F 21/32 |
| 2021/0098137 A1* | 4/2021 | Carroll | H04L 12/2832 |

* cited by examiner

*Primary Examiner* — Oschta I Montoya
(74) *Attorney, Agent, or Firm* — Haley Guiliano LLP

(57) ABSTRACT

Systems and methods are provided for controlling a set-top box via a smart speaker. One example method includes receiving, at the smart speaker, an input related to the set-top box. A request based on the input is transmitted to a server. At the server and based on the request, program listing data is retrieved. A command for controlling the set-top box is identified based on the program listing data. At least one of the program listing data and the identified command is transmitted from the server to the smart speaker. The identified command is transmitted from the smart speaker to the set-top box.

18 Claims, 16 Drawing Sheets

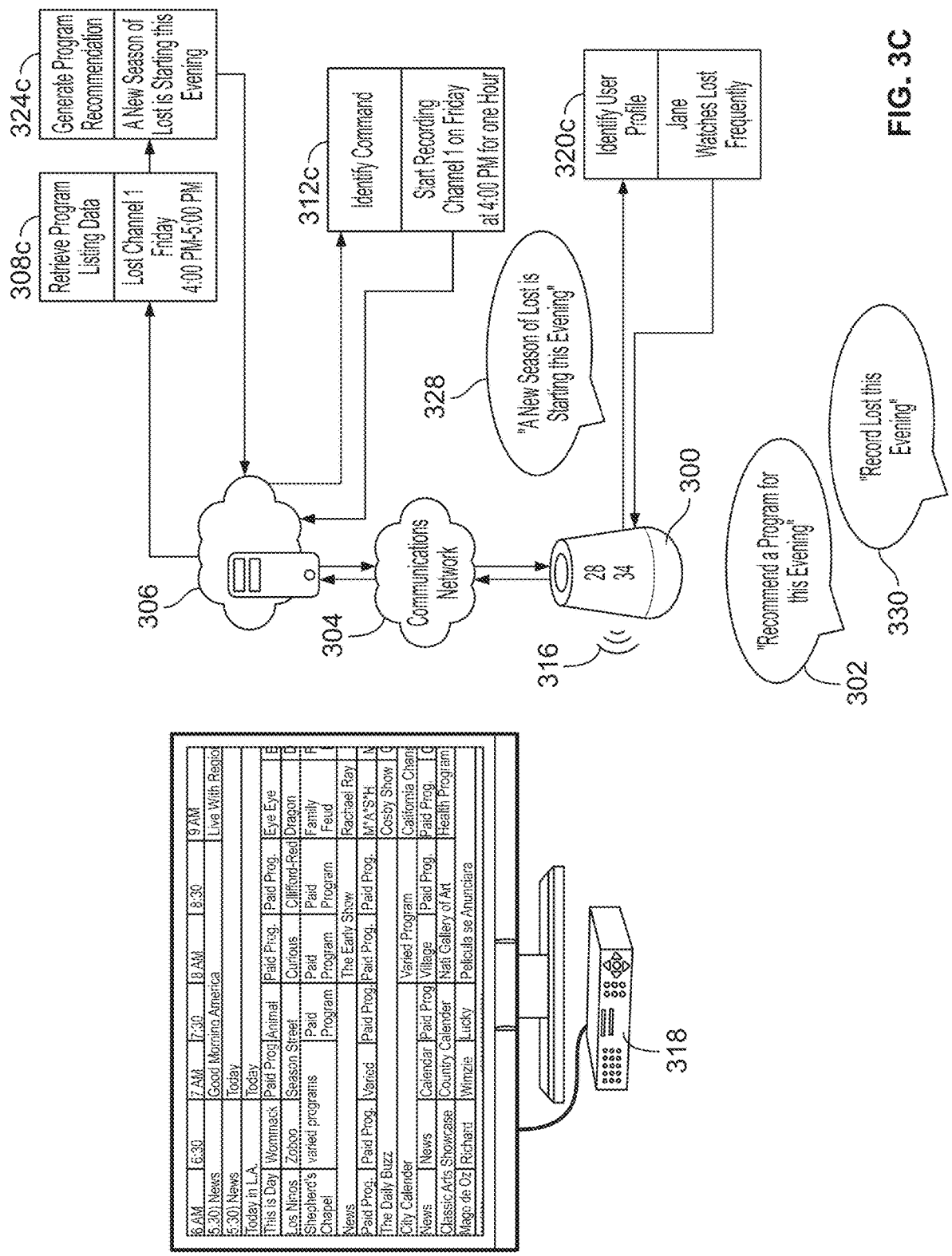

| Manufacturer | Device Identifier | Command | IR Code(s) | Manufacturer Universal Command |
|---|---|---|---|---|
| StarPlay | 123 STB | Record Episode of Lost on Channel 1, Friday, 17:00 for One Hour | Select EPG | Yes |
| | | | Select Channel | |
| | | | Select Day | |
| | | | Select Time | |
| | | | Select Episode | |
| | | | Select Record | |
| | AlphaOmega STB | | | |
| SunRecord | Helios STB Nova STB | Record All Episodes of Lost on Channel 1 | Select EPG | Yes |
| | | | Select Channel | |
| | | | Select Program | |
| | Helios STB | | Select Series Record | No |
| | Nova STB | | Select Series Record | No |
| UniversalShow | Milky STB | Record the Current Channel | Start Recording | No |
| | | | Stop Recording | No |
| | Way STB | | Start Recording | No |
| | | | Stop Recording | No |

FIG. 7

ENHANCED SET-TOP BOX CONTROL

BACKGROUND

The disclosure relates to controlling a set-top box via a smart speaker and, in particular, systems and related methods for retrieving program listing data from a server and identifying a command to control the set-top box based on the program listing data.

SUMMARY

With the proliferation of the Internet of Things (IoT), many traditional household devices are now connectible to the internet in order to provide enhanced capability. Household devices are often prefixed with "smart" to indicate that they are connectable to a network (such as the internet and/or a home network) and are capable of issuing and/or receiving commands via the network. Smart devices may be capable of receiving verbal commands from a user and issuing and/or receiving commands from other smart devices. Examples of smart devices include smart refrigerators, smart alarm systems, smart speakers, smart TVs, smart security systems and smart lights. A household that makes use of smart devices is often known as a "smart home." However, usually it is not possible to retrofit legacy devices to enable smart functionality. This is particularly relevant to set-top boxes, which are typically purchased or rented by a user and are not typically frequently replaced. A user may become used to interacting with their smart home, for example by issuing verbal commands to a smart speaker to play music, and the user may subsequently wish to control their legacy set-top box in a similar manner (i.e., by verbal commands). If the user replaces a working legacy set-top box with a smart set-top box, then the user incurs cost and adds to the growing problem of e-waste.

In view of the foregoing, it would be beneficial to have a system for controlling a set-top box via a smart speaker. Systems and methods are described herein for controlling a set-top box via a smart speaker. In accordance with an aspect of the disclosure, a method is provided for controlling a set-top box via a smart speaker. An input related to the set-top box is received at a the smart speaker. A request, based on the input, is transmitted to a server. At the server and based on the request, program listing data is retrieved. A command for controlling the set-top box based on the program listing data is identified. At least one of the program listing data and the identified command is transmitted from the server to the smart speaker. The identified command is transmitted from the smart speaker to the set-top box. The program listing data may be transmitted from the server to the smart speaker, and the command may be identified at the smart speaker. Alternatively, the command may be identified at the server, and the command may be transmitted from the server to the smart speaker. The command may be received via a microphone of the smart speaker. The command may be transmitted from the smart speaker to the set-top box via an infrared transmitter or a BLUETOOTH transmitter. The program listing data may comprise one or more of data, time and/or channel information for a television program and/or a movie.

An example implementation of such a method is described in connection with a user interacting with a smart speaker. A user asks the smart speaker to record the next episode of "Lost." In this example, the smart speaker transmits, via a Wi-Fi network and the internet, a request to a server, and the request comprises a request for a command to control a set-top box in order to record the next episode of Lost. The server retrieves program listing data for the next episode of Lost and determines that it will be shown on Channel 1, on Friday, at 4:00 pm, for one hour. In this example, a command for controlling the set-top box is identified at the server, and the command includes the appropriate IR codes to control the set-top box such that the next episode of Lost is recorded at the set-top box. The command is transmitted from the server, via the internet and the Wi-Fi network, and is received at the smart speaker. The smart speaker transmits the appropriate infrared codes to the set-top box, thereby causing the set-top box to record the next episode of Lost.

The method may further include the input being a first input and being for a program recommendation. The request may be a first request and may be based on the first input. A user profile may be identified. Program listing data may be retrieved based on the first request and the user profile. A program recommendation may be generated, at the server, based on at least one of the user profile, the first request and/or the program listing data. The program recommendation may be transmitted, from the server, to the smart speaker. The program recommendation may be outputted at the smart speaker. A second input related to the program recommendation and the set-top box may be received at the smart speaker. The command for controlling the set-top box may be identified based on the second input.

The method may further include identifying a set-top box identifier associated with the set-top box at the smart speaker. The set-top box identifier may be transmitted to a server. Based on the set-top box identifier, a control command set of one or more control commands for controlling the set-top box may be retrieved at the server. A command, from the control command set, for controlling the set-top box based on the program listing data may be identified. The identified command, from the control command set, may be transmitted from the server to the smart speaker. The identified command, from the control command set, may be transmitted from the smart speaker to the set-top box.

The method may further include receiving one or more control commands from a control device of the set-top box at the smart speaker. The one or more control commands may be stored, thereby creating a received control command set. A command, from the received command set, for controlling the set-top box based on the program listing data may be identified. The identified command, from the received command set, may be transmitted from the smart speaker to the set-top box.

The method may further include identifying, at a second smart speaker, a set-top box identifier associated with a second set-top box. One or more control commands from a control device of the second set-top box may be received. the set-top box identifier associated with the second set-top box, and the one or more control commands may be transmitted to the server. At the server, the set-top box identifier associated with the second set-top box and the one or more control commands may be stored, thereby creating a received control command set. At a first smart speaker, a set-top box identifier associated with a first set-top box may be identified. The set-top box identifier associated with the first set-top box may be transmitted to the server. That the set-top box identifier associated with the second set-top box corresponds to the set-top box identifier associated with the first set-top box may be identified at the server. A command, from the control command set, for controlling the set-top box based on the program listing data may be identified. The identified command, from the control command set, may be transmitted from the server to the smart speaker. The identified command, from the control command set, may be transmitted from the smart speaker to the set-top box.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 3C shows an exemplary environment in which a set-top box is controlled via a smart speaker, in accordance with some embodiments of the disclosure;

FIG. 7 is an exemplary data structure for indicating how commands are translated to commands that are receivable by a set-top box and how commands for different manufacturers and devices are stored, in accordance with some embodiments of the disclosure;

DETAILED DESCRIPTION

Systems and methods are described herein for controlling a set-top box via a smart speaker. As referred to herein, a smart speaker includes any speaker device that is capable of receiving user input, transmitting the user input via a network to a server and receiving a command via the network from the server. The user input may be verbal input, or it may be tactile input. The verbal input may be received by an integral microphone of the smart speaker or it may be received by an external microphone that is connected to the smart speaker by wired or wireless, for example BLUETOOTH, means. Tactile input includes, for example, input provided via buttons or a touchscreen at the smart speaker or via a keyboard and/or mouse connected to the smart speaker, for example via BLUETOOTH or a USB cable. The smart speaker includes means to transmit the command from the smart speaker to the set-top box, for example an infrared transmitter and/or a Bluetooth transmitter. Typically, a smart speaker is connected to a network, such as a home network, via Wi-Fi; however, the smart speaker may also be connected to a network via wired means, such as an ethernet cable.

As referred to herein, a set-top box is any device that comprises a processor and a memory and is capable of receiving a television signal and providing an output based on the television signal. Television signals include cable television signals, satellite television signals, over-the-air television signals and internet protocol television signals.

As referred to herein, program listing data is any data that is associated with a television program, movie and/or any other program that is transmitted to the set-top box. Program listing data typically includes the date, time and/or channel associated with the broadcast of a television program and/or movie.

A network is any network on which computing devices can communicate. This includes wired and wireless networks. It also includes intranets, the internet and/or any combination of the two. Where multiple devices are communicating, this includes known arrangements of devices. For example, it may include multiple devices communicating via a central server, or via multiple servers. In other cases, it may include multiple devices communicating in a peer-to-peer manner as defined by an appropriate peer-to-peer protocol.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, Random Access Memory (RAM), etc.

Figure 1:
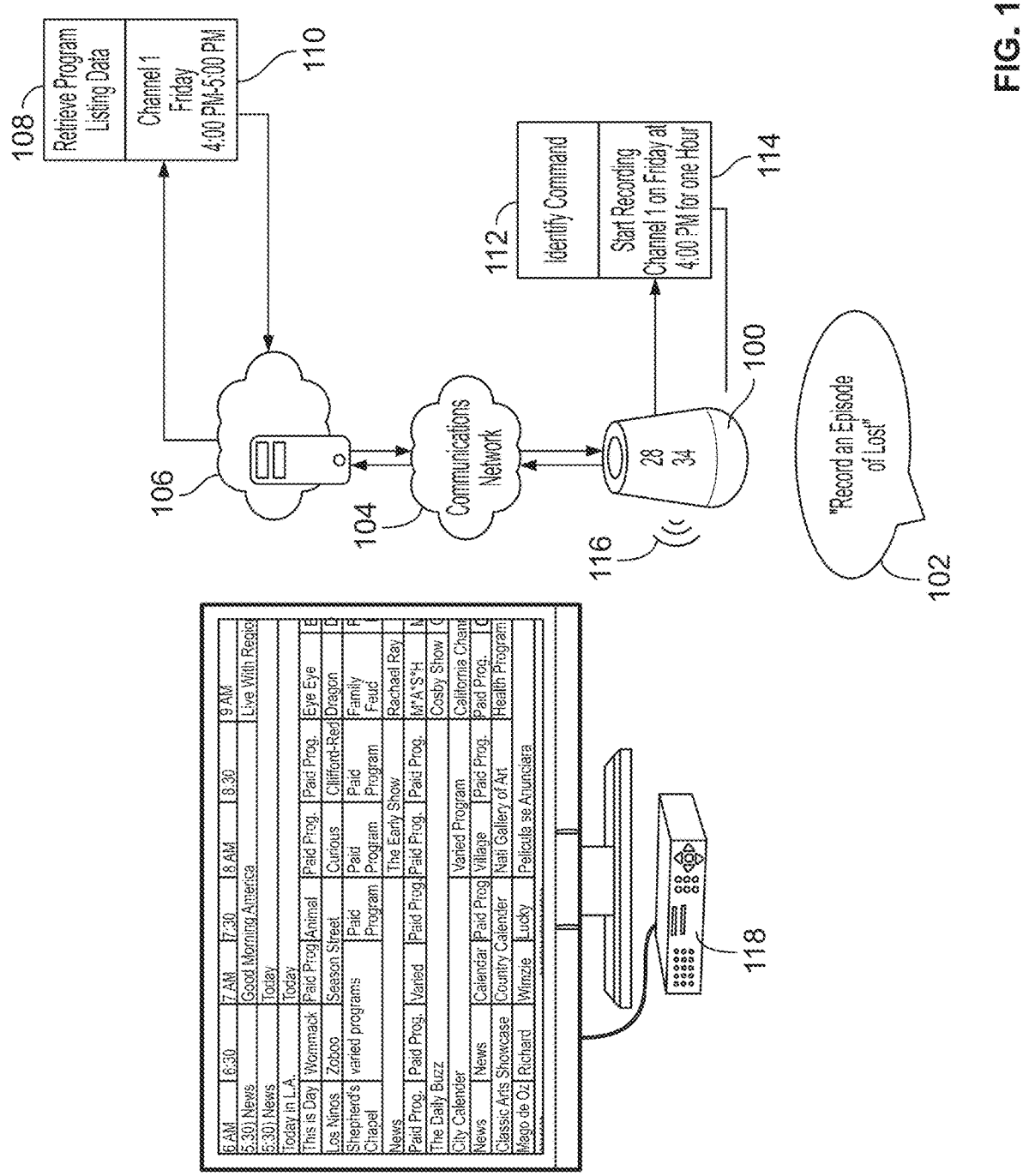
FIG. 1 shows an exemplary environment in which a set-top box is controlled via a smart speaker, in accordance with some embodiments of the disclosure.

FIG. 1 shows an exemplary environment in which a set-top box is controlled via a smart speaker, in accordance with some embodiments of the disclosure. At a smart speaker 100, a user provides verbal input 102. In this example, the input is "Record an episode of Lost." The smart speaker receives the input via a microphone and transmits a request, via the communications network 104 (e.g., the internet), to a server 106. At the server 106, the request is interpreted, and it is determined that the user has indicated that they would like to record an episode of Lost. The request may be interpreted by a combination of voice recognition and a trained network. At the server 106, program listing data associated with Lost is retrieved 108. In this example, it is identified that Lost is broadcast on Channel 1, Friday, between the hours of 4:00-5:00 pm 110.

The program listing data is transmitted from the server 106, via the communications network 104, to the smart speaker 100. At the smart speaker 100, one or more commands to control the set-top box 118 are identified 112. In this example, the commands required are those to control the set-top box such that it starts recording Channel 1 on Friday at 4:00 pm for one hour 114. The smart speaker 100 may access a database of, for example, infrared codes that are associated with the set-top box 118 manufacturer and/or model. The smart speaker 100 may access the appropriate control commands that enable it to instruct the set-top box 118 to start recording Channel 1 on Friday at 4:00 pm for one hour. This may include infrared control codes to control the electronic program guide (EPG), select different channels via the EPG, select different days and times via the EPG and record a selected program in the EPG. Optionally, the command may automatically include, for example, a buffer of ten minutes with the program listing data to ensure that the start and finish of the episode are recorded. For example, the recording may start at 3:55 pm for an hour and ten minutes. Once the appropriate infrared control codes are identified, they are transmitted 116 to the set-top box 118 via an infrared transmitter of the smart speaker 100. In another example, the set-top box may be capable of receiving control codes via Bluetooth and/or Wi-Fi. In this case, the smart speaker may transmit the codes to the set-top box via a Bluetooth transmitter and/or a Wi-Fi transmitter.

Figure 2:
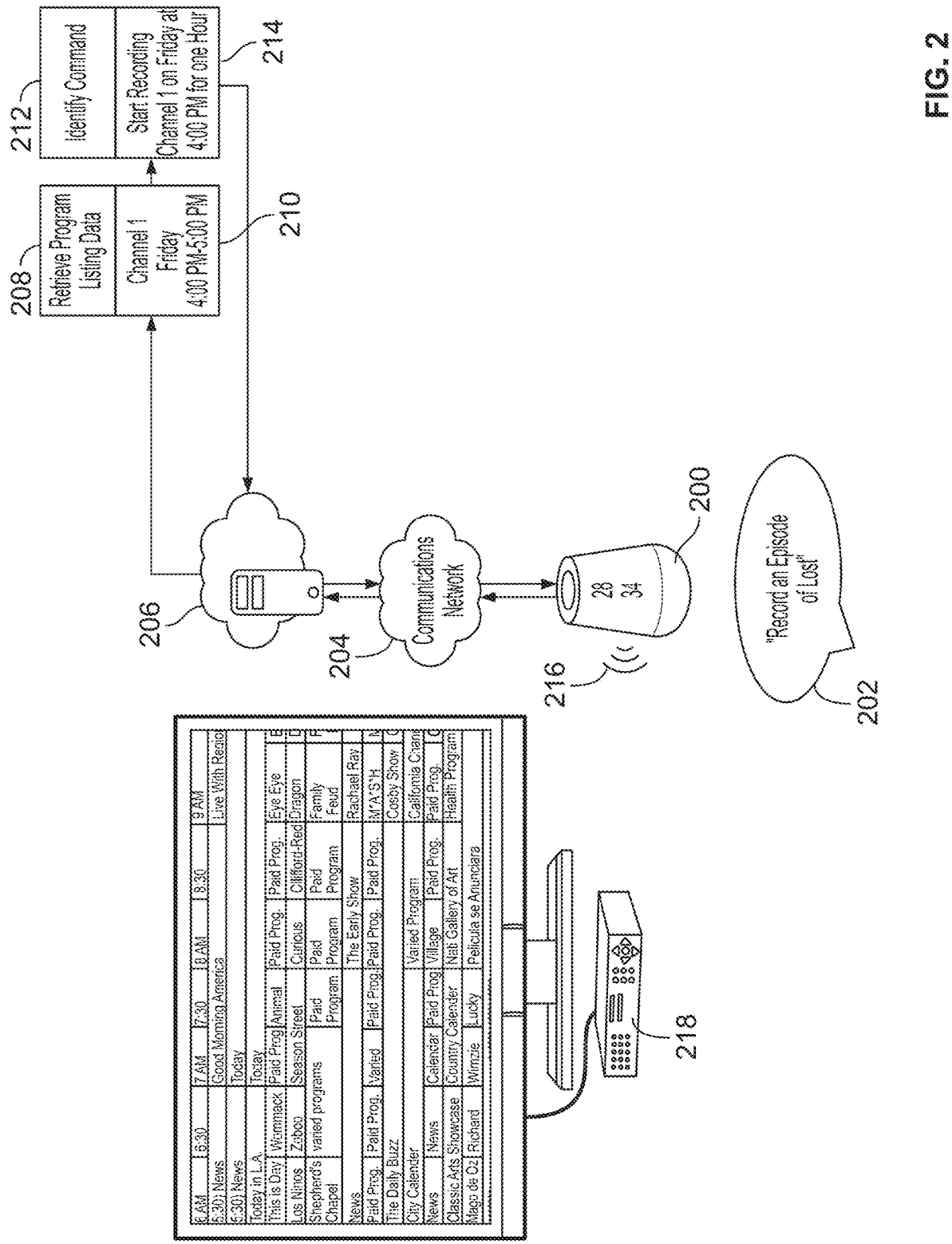
FIG. 2 shows an exemplary environment in which a set-top box is controlled via a smart speaker, in accordance with some embodiments of the disclosure.

FIG. 2 shows an exemplary environment in which a set-top box is controlled via a smart speaker, in accordance with some embodiments of the disclosure. The smart speaker 200 operates in a manner similar to that of the smart speaker of FIG. 1. A user provides verbal input 202 at the smart speaker 200. In this example, the input is "Record an episode of Lost." The smart speaker receives the input via a microphone and transmits a request, via the communications network 204 (e.g., the internet), to a server 206. At the server 206, the request is interpreted, and it is determined that the user has indicated that they would like to record an episode of Lost. The request may be interpreted by a combination of voice recognition and a trained network. At the server 206, program listing data associated with Lost is retrieved 208. In this example, it is identified that Lost is broadcast on Channel 1, Friday, between the hours of 4:00-5:00 pm 210. At the server 206 one or more commands to control the set-top box 218 are identified 212. In this example, the commands required are those to control the set-top box such that it starts recording Channel 1 on Friday at 4:00 pm for one hour 214. The server 206 may access a database of, for example, infrared codes that are associated with the set-top box 218 manufacturer and/or model. The server 206 may access the appropriate control commands that enable the smart speaker 200 to instruct the set-top box 218 to start recording Channel 1 on Friday at 4:00 pm for one hour. This may include infrared codes to control the EPG, select different channels via the EPG, select different days and times via the EPG and record a selected program in the EPG. Optionally, the command may automatically include, for example, a buffer of ten minutes with the program listing data to ensure that the start and finish of the episode are recorded. For example, the recording may start at 3:55 pm for an hour and ten minutes. Once the appropriate infrared control codes are identified, they are transmitted via the communications network 204 to the smart speaker 200. At the smart speaker 200, the infrared control codes are transmitted 216 to the set-top box 218 via an infrared transmitter of the smart speaker 200. In another example, the set-top box may be capable of receiving control codes via Bluetooth and/or Wi-Fi. In this case, the smart speaker may transmit the codes to the set-top box via a Bluetooth transmitter and/or a Wi-Fi transmitter.

Figure 3A:
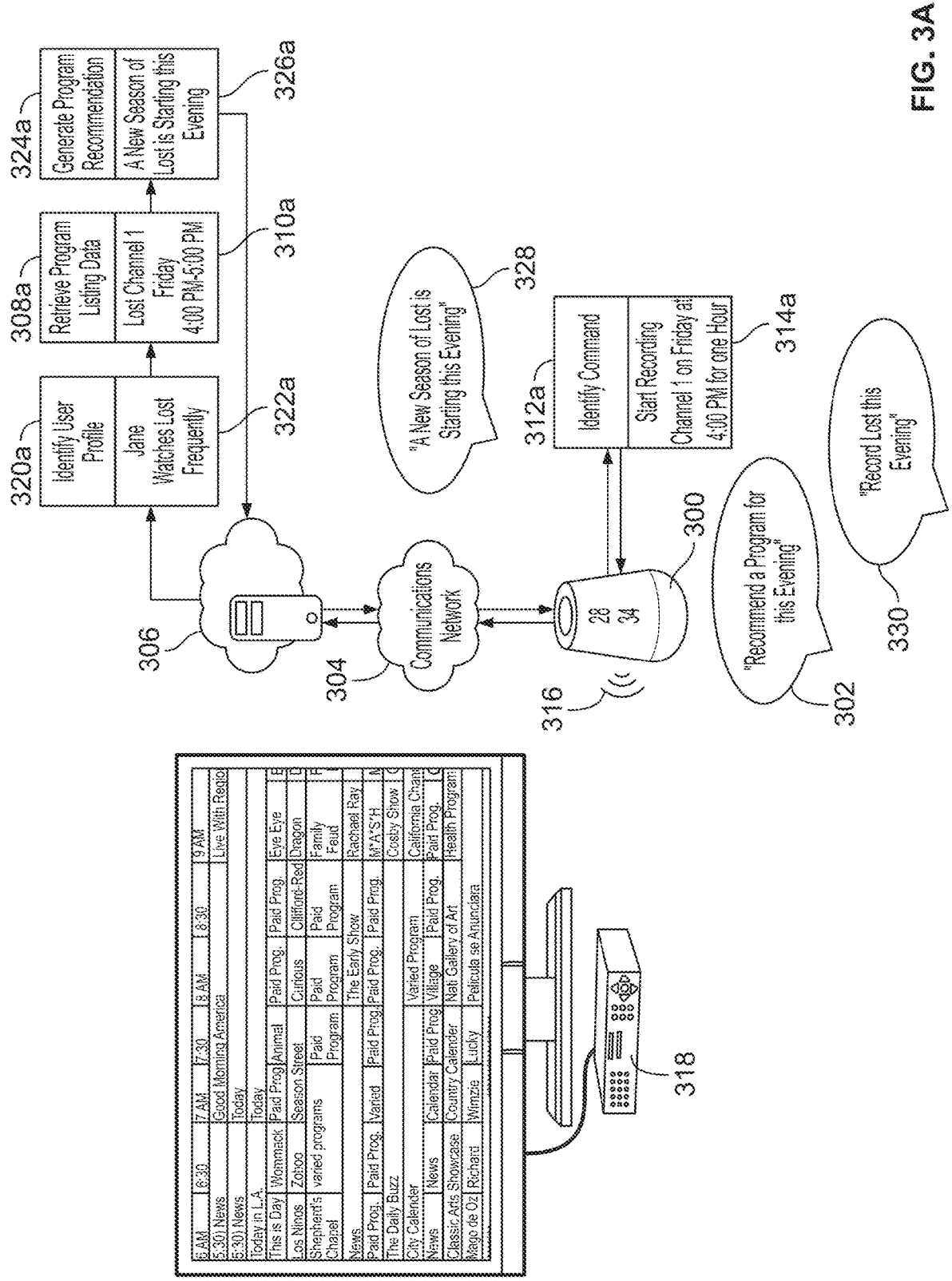
FIG. 3A shows an exemplary environment in which a set-top box is controlled via a smart speaker, in accordance with some embodiments of the disclosure.

FIG. 3A shows an exemplary environment in which a set-top box is controlled via a smart speaker, in accordance with some embodiments of the disclosure. At a smart speaker 300, a user provides verbal input 302. In this example, the input is "Recommend a program for this evening." In this example, the user is providing the input on a Friday. The smart speaker receives the input via a microphone and transmits a request, via the communications network 304 (e.g., the internet), to a server 306. At the server 306, a user profile is identified 320a and the request is interpreted. The request may be interpreted by a combination of voice recognition and a trained network. The user profile may be identified based on a unique identifier associated with the smart speaker, for example a cookie, MAC address, user profile logged in at the smart device and/or voice recognition. In this example, the user profile comprises an identifier, "Jane," and information associated with the user, "Watches Lost frequently." The user profile may be associated with a particular device and/or may be associated with a particular user. The user profile may comprise data based on the viewing habits of a user. The data may be provided manually by the user or may be determined based on the input provided, at the smart speaker, by the user. Program listing data is retrieved 308a based on the user profile and the request. For example, if the user profile indicates that the user frequently watches Lost, then program listing data associated with Lost is retrieved. In the example, the program listing data associated with Lost is that it is broadcast on Channel 1, Friday, between the hours of 4:00-5:00 pm 310a. Once a suitable program is identified, a program recommendation is generated 324a. In this example the recommendation is "A new season of Lost is starting this evening." The recommendation is transmitted from the server 306, via the communications network 304, to the smart speaker 300. In this example, the program listing data is also transmitted to the smart speaker 300. The smart speaker outputs, via a speaker of the smart speaker 300, the recommendation "A new season of Lost is starting this evening" 328.

However, in some examples (not shown), the user input may include limits that preclude certain recommendations. For example, if the user had specified "this morning," rather than "this evening," Lost would not have been a suitable recommendation. If, for example, after retrieving the program listing data associated with a first item of the user profile, it is determined that no suitable recommendation is available, further items in the user profile are identified. For example, the profile may also indicate that the user enjoys comedy shows. In this example, program listing data associated with comedy shows may also be retrieved in order to determine whether a comedy program is being broadcast "this morning."

In response to the recommendation, the user provides a second input, "Record Lost this evening" 330. At the smart speaker 300, the input is interpreted and one or more commands to control the set-top box 318 are identified 312a. The request may be interpreted by a combination of voice recognition and a trained network. In this example, the commands required are those to control the set-top box such that it starts recording Channel 1 on Friday at 4:00 pm for one hour 314a. The smart speaker 300 may access a database of, for example, infrared codes that are associated with the set-top box 318 manufacturer and/or model. The smart speaker 300 may access the appropriate control commands that enable it to instruct the set-top box 318 to start recording Channel 1 on Friday at 4:00 pm for one hour. This may include infrared control commands to control the EPG, select different channels via the EPG, select different days and times via the EPG and record a selected program in the EPG. Optionally, the command may automatically include, for example, a buffer of ten minutes with the program listing data to ensure that the start and finish of the episode are recorded. For example, the recording may start at 3:55 pm for an hour and ten minutes. Once the appropriate infrared control codes are identified, they are transmitted 316 to the set-top box 318 via an infrared transmitter of the smart speaker 300. In another example, the set-top box may be capable of receiving control codes via Bluetooth and/or Wi-Fi. In this case, the smart speaker may transmit the codes to the set-top box via a Bluetooth transmitter and/or a Wi-Fi transmitter.

Figure 3B:
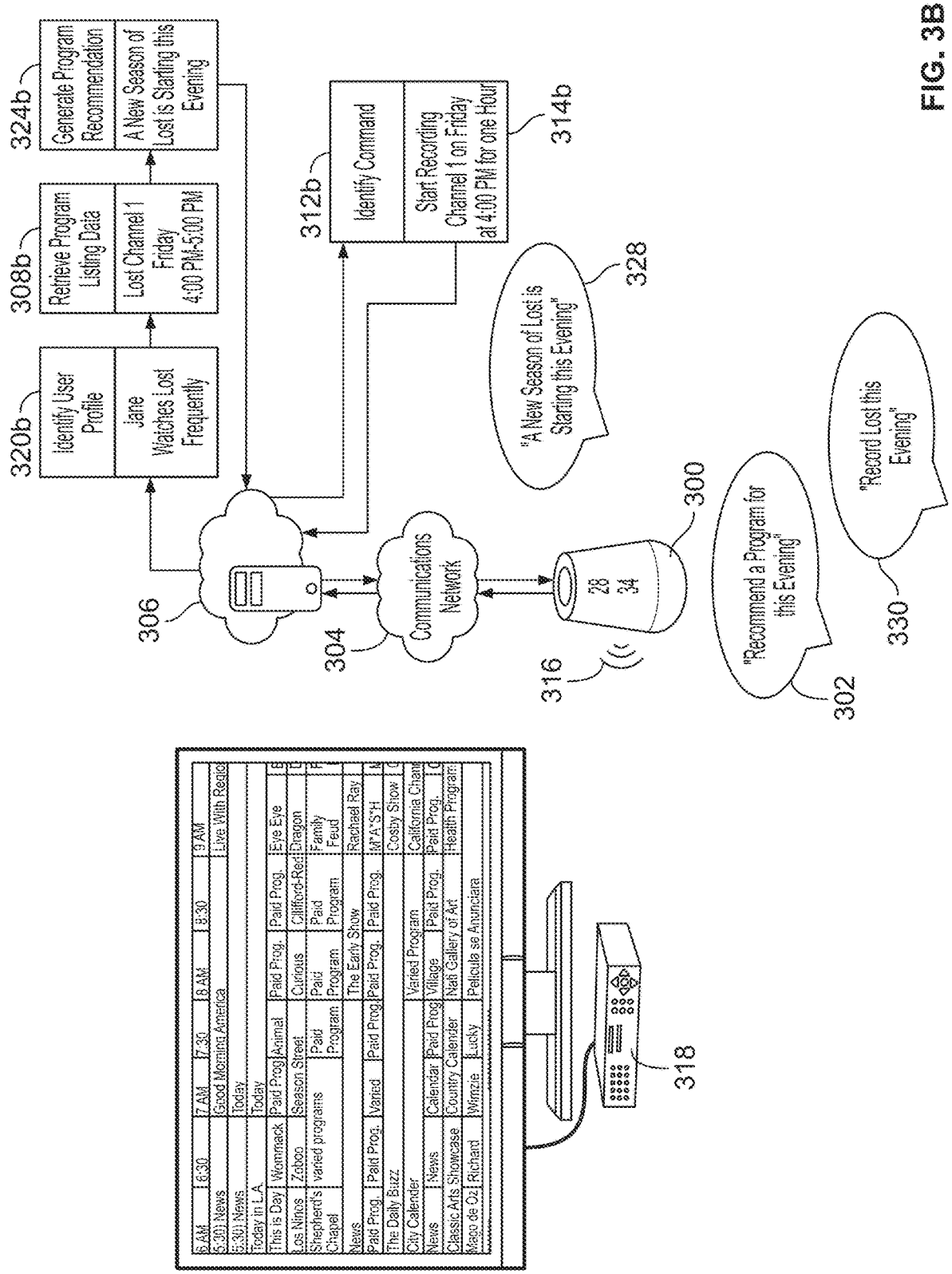
FIG. 3B shows an exemplary environment in which a set-top box is controlled via a smart speaker, in accordance with some embodiments of the disclosure.

FIGS. 3B and 3C show exemplary environments in which a set-top box is controlled via a smart speaker, in accordance with some embodiments of the disclosure. The exemplary environments of FIGS. 3B and 3C are variations on the exemplary environment of FIG. 3A, demonstrating that some of the steps may be performed either at the smart speaker 300 or the server 306.

In FIG. 3B, as in FIG. 3A, the user profile is identified 320b at the server, the program listing data is retrieved 308b at the server and the program recommendation is generated 324b at the server. The recommendation is transmitted from the server 306, via the communications network 304, to the smart speaker 300. The smart speaker outputs, via a speaker of the smart speaker 300, the recommendation "A new season of Lost is starting this evening" 328. In response to the recommendation, the user provides a second input, "Record Lost this evening" 330. A request based on the second input is transmitted to the server 306. At the server 306 the input is interpreted and one or more commands to control the set-top box 318 are identified 312b. The request may be interpreted by a combination of voice recognition and a trained network. In this example, the commands required are those to control the set-top box such that it starts recording Channel 1 on Friday at 4:00 pm for one hour 314b. The server 306 may access a database of, for example, infrared codes that are associated with the set-top box 318 manufacturer and/or model. The server 306 may access the appropriate control commands that enable the smart speaker 300 to instruct the set-top box 318 to start recording Channel 1 on Friday at 4:00 pm for one hour. This may include infrared control codes to control the EPG, select different channels via the EPG, select different days and times via the EPG and record a selected program in the EPG. Optionally, the command may automatically include, for example, a buffer of ten minutes with the program listing data to ensure that the start and finish of the episode are recorded. For example, the recording may start at 3:55 for an hour and ten minutes. The identified commands are transmitted to the smart speaker 300 and are transmitted 316 to the set-top box 318 via an infrared transmitter of the smart speaker 300.

In FIG. 3C, as in FIG. 3B, the program listing data is retrieved 308c at the server, the program recommendation is generated 324c at the server and, in response to a second user input, one or more commands are identified at the server 312c and transmitted via the smart speaker 300 to the set-top box 318. The user profile is identified 320c at the smart speaker 300. As before, the user profile may be identified based on a unique identifier associated with the smart speaker, for example a cookie, MAC address, user profile logged in at the smart device and/or voice recognition. In this example, the user profile comprises an identifier, "Jane," and information associated with the user, "Watches Lost frequently." The user profile may be associated with a particular device and/or may be associated with a particular user. The user profile may comprise data based on the viewing habits of a user. The data may be provided manually by the user or may be determined based on the input provided, at the smart speaker, by the user. Relevant information from the user profile 320c is transmitted from the smart speaker 300 to the server 306. By transmitting only relevant information to the server 306, the user retains more control over their personal information, thereby reducing any privacy concerns the user may have.

Figure 4:
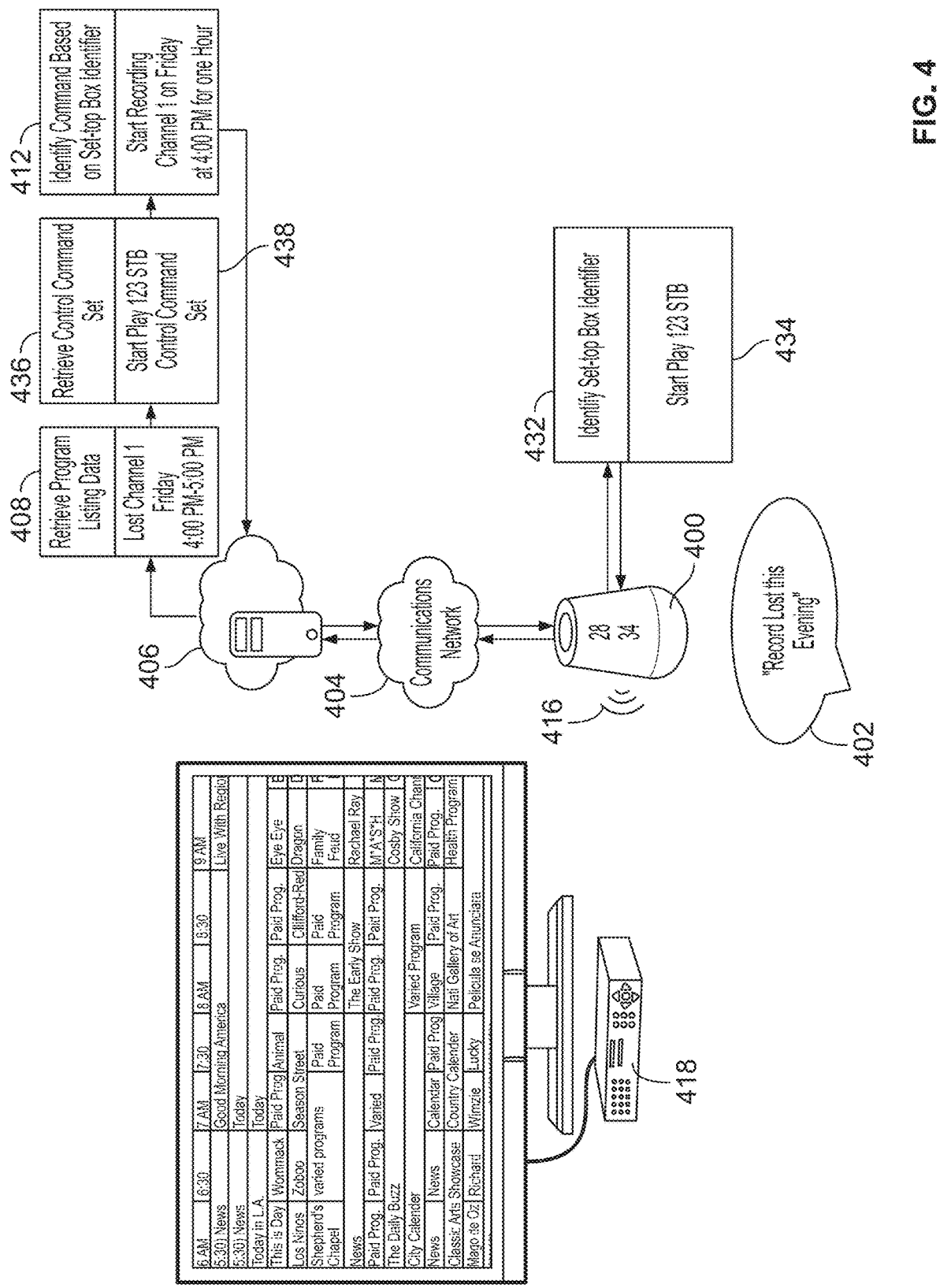
FIG. 4 shows an exemplary environment in which a set-top box is controlled via a smart speaker, in accordance with some embodiments of the disclosure.

FIG. 4 shows an exemplary environment in which a set-top box is controlled via a smart speaker, in accordance with some embodiments of the disclosure. The smart speaker 400 operates in a manner similar to that of the smart speaker of FIG. 1. A user provides verbal input 402 at the smart speaker 400. In this example, the input is "Record Lost this evening." The smart speaker receives the input via a microphone and identifies a set-top box identifier 432 associated with a set-top box 418 at the smart speaker 400. The set-top box identifier is any identifier that allows control codes relevant to the set-top box to be identified. For example, if a manufacturer uses the same control codes for all their set-top boxes, then only the manufacturer may be identified. However, if a manufacturer uses different control codes for different set-top box models, then a model identifier may be identified as well. In this example, the set-top box identifier is "StarPlay 123 STB." The smart speaker may identify the set-top box by outputting a query to a user, such as "Please provide the set-top box manufacturer and model." Alternatively, the smart speaker may capture control codes from a remote control of the set-top box, for example when a user is using the set-top box in normal use, and query a database of known control codes for different set-top boxes in order to identify the set-top box. The smart speaker 400 transmits a request and the set-top box identifier, via the communications network 404 (e.g., the internet), to a server 406. At the server 406, the request is interpreted, and it is determined that the user has indicated that they would like to record an episode of Lost. The request may be interpreted by a combination of voice recognition and a trained network. At the server 406, program listing data associated with Lost is retrieved 408. A control command set associated with the identified set-top box is retrieved 436 at the server. In this example, the control command set is that associated with the StarPlay 123 STB 438. The control command set may be stored at the server 406 and/or the server 406 may communicate with another computing device to retrieve the control command set. For example, the server 406 may communicate with a manufacturer server in order to retrieve the control command set. At the server 406 one or more commands to control the set-top box 418 are identified 412 from the retrieved control command set 438. In this example, the commands required are those to control the set-top box such that it starts recording Channel 1 on Friday at 4:00 pm for one hour 214. The server 406 may access the appropriate control commands that enable the smart speaker 400 to instruct the set-top box 418 to start recording Channel 1 on Friday at 4:00 pm for one hour. This may include codes to control the EPG, select different channels via the EPG, select different days and times via the EPG and record a selected program in the EPG. Once the appropriate infrared control codes are identified, they are transmitted via the communications network 404 to the smart speaker 400. At the smart speaker 400, the infrared control codes are transmitted 416 to the set-top box 418 via an infrared transmitter of the smart speaker 400. In another example, the set-top box may be capable of receiving control codes via Bluetooth and/or Wi-Fi. In this case, the smart speaker may transmit the codes to the set-top box via a Bluetooth transmitter and/or a Wi-Fi transmitter.

Figure 5A:
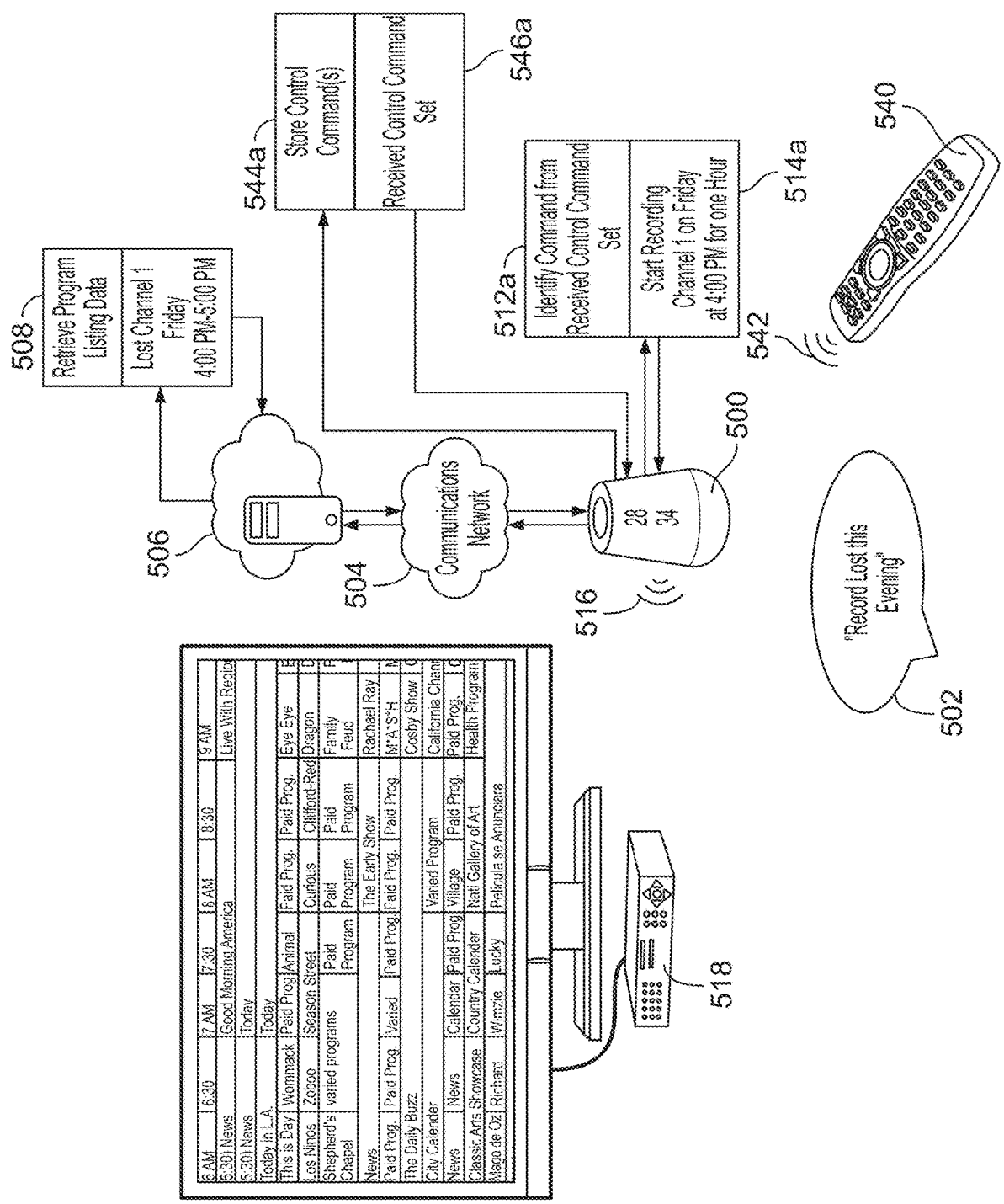
FIG. 5A shows an exemplary environment in which a set-top box is controlled via a smart speaker, in accordance with some embodiments of the disclosure.

FIG. 5A shows an exemplary environment in which a set-top box is controlled via a smart speaker, in accordance with some embodiments of the disclosure. At a smart speaker 500, a user provides control commands in the form of infrared control codes via a remote control 540 of the set-top box 518. The user points the remote control 540 at the smart speaker 500 and presses buttons on the remote control 540 that are associated with commands, so that the control codes are transmitted 542 from the remote control 540 to the smart speaker 500. The smart speaker may output a request via a speaker, such as "Press record now," and may output a confirmatory phrase once the infrared control code is received, for example "Record received." The smart speaker may access a database of commonly used commands and may output, at a speaker of the smart speaker, requests based on the database of commonly used commands. The control commands comprising the control command set 546a (i.e., the received infrared control codes) are stored 544a at the smart speaker 500. In this way, if a smart speaker cannot access control codes for a set-top box, the smart speaker can learn how to control the set-top box.

As before, a user provides verbal input 502. In this example, the input is "Record Lost this evening." The smart speaker receives the input via a microphone and transmits a request, via the communications network 504 (e.g., the internet), to a server 506. At the server 506, the request is interpreted, and it is determined that the user has indicated that they would like to record an episode of Lost. The request may be interpreted by a combination of voice recognition and a trained network. At the server 506, program listing data associated with Lost is retrieved 508. The program listing data is transmitted from the server 506, via the communications network 504, to the smart speaker 500. At the smart speaker 500, one or more commands to control the set-top box 518 are identified 512a from the received control command set stored at the smart speaker 500 (i.e., the received infrared control codes). In this example, the commands required are those to control the set-top box such that it starts recording Channel 1 on Friday at 4:00 pm for one hour 514a. The smart speaker 500 may access the appropriate command codes that enable it to instruct the set-top box 518 to start recording Channel 1 on Friday at 4:00 pm for one hour. This may include codes to control the EPG, select different channels via the EPG, select different days and times via the EPG and record a selected program in the EPG. Optionally, the command may automatically include, for example, a buffer of ten minutes with the program listing data to ensure that the start and finish of the episode are recorded. For example, the recording may start at 3:55 pm for an hour and ten minutes. Once the appropriate infrared control codes are identified, they are transmitted 516 to the set-top box 518 via an infrared transmitter of the smart speaker 500. In another example, the set-top box may be capable of receiving control codes via Bluetooth and/or Wi-Fi. In this case, the smart speaker may transmit the codes to the set-top box via a Bluetooth transmitter and/or a Wi-Fi transmitter. If the smart speaker 500 determines that a required command is not available, the smart speaker 500 may output a request that a user provide the required command via the remote control 540.

Figure 5B:
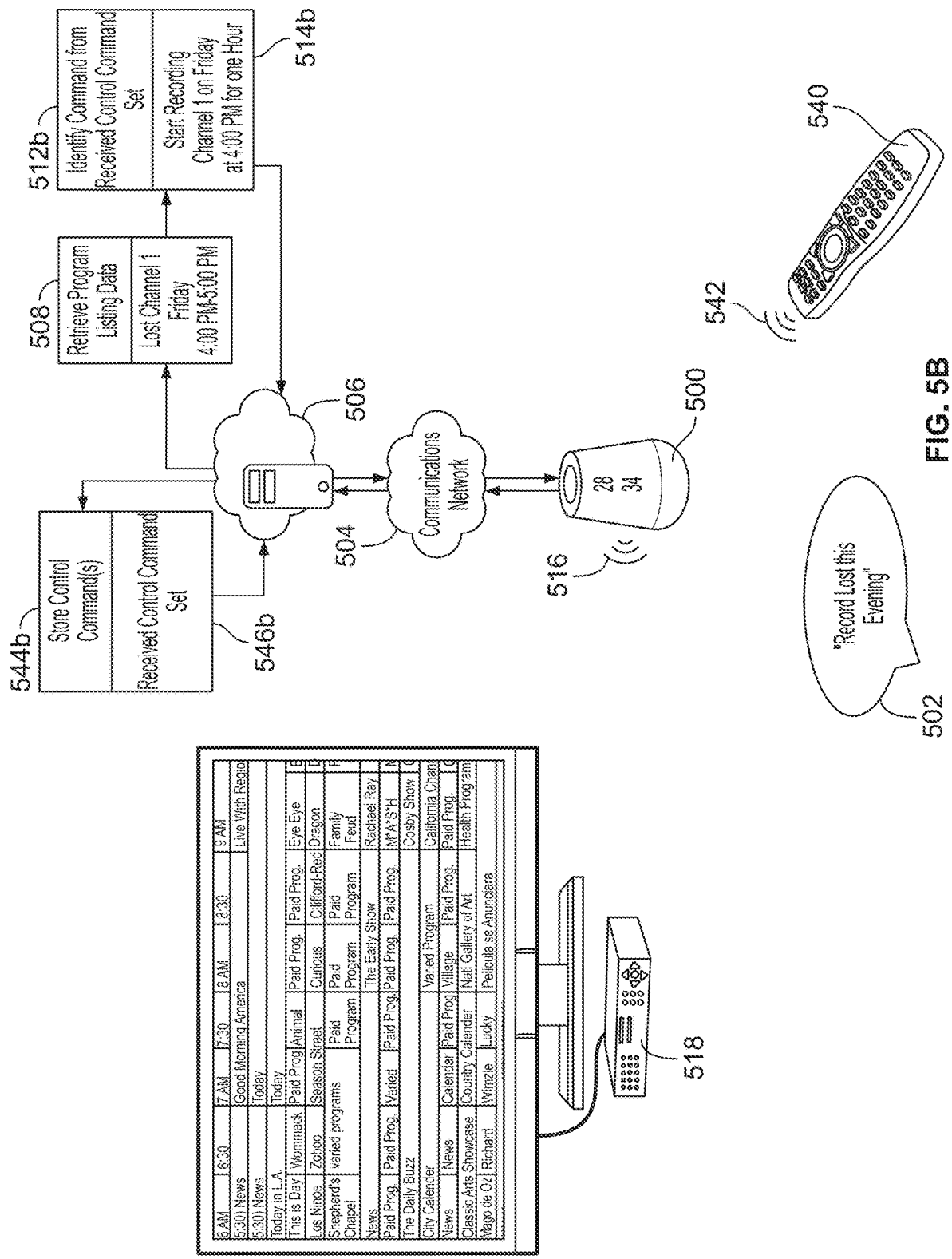
FIG. 5B shows an exemplary environment in which a set-top box is controlled via a smart speaker, in accordance with some embodiments of the disclosure.

FIG. 5B shows an exemplary environment in which a set-top box is controlled via a smart speaker, in accordance with some embodiments of the disclosure. The exemplary environment of FIG. 5B is similar to that of FIG. 5A, however, the received control command set is stored at the server 506. After the user has provided the control commands, via the remote control 540, to the smart speaker 500, the control commands are transmitted, from the smart speaker 500 and via the communications network 504, to the server 506. The control commands comprising the control command set 546b (i.e., the received infrared control codes) are stored 544b at the server 506.

As before, a user provides verbal input 502. In this example, the input is "Record Lost this evening." The smart speaker receives the input via a microphone and transmits a request, via the communications network 504 (e.g., the internet), to a server 506. At the server 506, the request is interpreted, and it is determined that the user has indicated that they would like to record an episode of Lost. The request may be interpreted by a combination of voice recognition and a trained network. At the server 506, program listing data associated with Lost is retrieved 508. At the server 506 one or more commands to control the set-top box 518 are identified 512b from the received control command set stored at the server 506 (i.e., the received infrared control codes). In this example, the commands required are those to control the set-top box such that it starts recording Channel 1 on Friday at 4:00 pm for one hour 514b. The server 506 may access the appropriate command codes that enable it to instruct the set-top box 518 to start recording Channel 1 on Friday at 4:00 pm for one hour. This may include codes to control the EPG, select different channels via the EPG, select different days and times via the EPG and record a selected program in the EPG. Optionally, the command may automatically include, for example, a buffer of ten minutes with the program listing data to ensure that the start and finish of the episode are recorded. For example, the recording may start at 3:55 pm for an hour and ten minutes. Once the appropriate infrared control codes are identified, they are transmitted from the server 506, via the communications network 504, to the smart speaker 500. The control codes are then transmitted 516 from the smart speaker 500 to the set-top box 518 via an infrared transmitter of the smart speaker 500.

Figure 6:
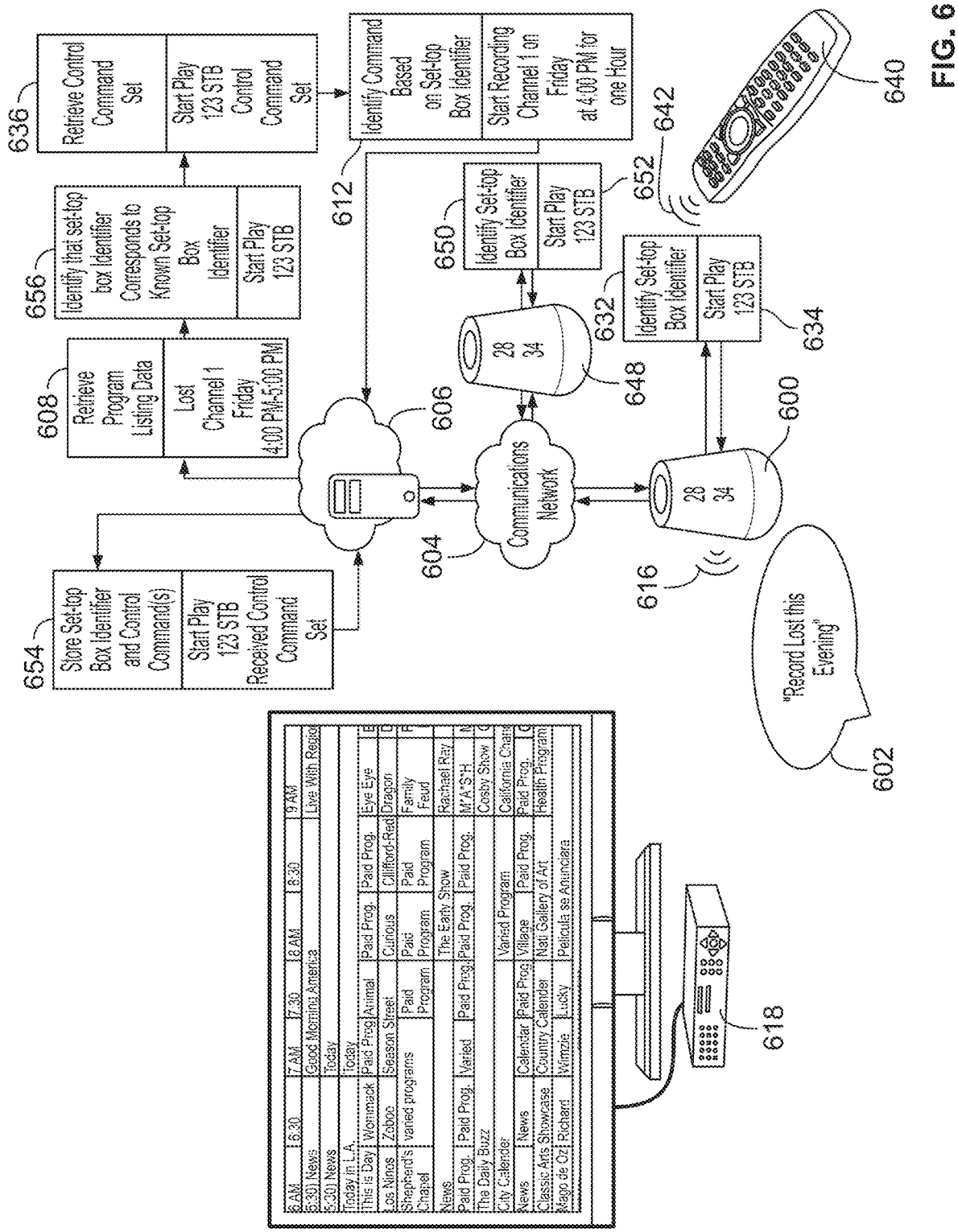
FIG. 6 shows an exemplary environment in which a set-top box is controlled via a smart speaker, in accordance with some embodiments of the disclosure.

FIG. 6 shows an exemplary environment in which a set-top box is controlled via a smart speaker, in accordance with some embodiments of the disclosure. At a first smart speaker 648, a first set-top box identifier is identified 650. The set-top box identifier is any identifier that allows control codes relevant to the set-top box to be identified. For example, if a manufacturer uses the same control codes for all their set-top boxes, then only the manufacturer may be identified. However, if a manufacturer uses different control codes for different set-top box models, then a model identifier may be identified as well. In this example, the set-top box identifier 652 is "StarPlay 123 STB." At the first smart speaker 648, a user provides control commands in the form of infrared control codes via a remote control 640 of the first set-top box. The user points the remote control 640 at the first smart speaker 648 and presses buttons on the remote control 640 that are associated with commands, so that the control codes are transmitted 642 from the remote control 640 to the first smart speaker 648. The smart speaker may output a request via a speaker, such as "Press record now," and may output a confirmatory phrase once the infrared control code is received, for example "Record received." The smart speaker may access a database of commonly used commands and may output, at a speaker of the smart speaker, requests based on the database of commonly used commands. After the user has provided the control commands, the control commands and the first set-top box identifier 652 are transmitted, from the first smart speaker 648 and via the communications network 604 (e.g., the internet), to the server 606. At the server 606, the set-top box identifier and a control command set, of the received control commands, are stored 654 such that the control commands are associated with the set-top box identifier.

A user provides verbal input 602 at a second smart speaker 600. In this example, the input is "Record Lost this evening." The smart speaker receives the input via a microphone and identifies a set-top box identifier 634. In this example, the set-top box identifier is "StarPlay 123 STB." The smart speaker 600 transmits a request and the set-top box identifier, via the communications network 604 (e.g., the internet), to the server 606. At the server 606, the request is interpreted, and it is determined that the user has indicated that they would like to record an episode of Lost. The request may be interpreted by a combination of voice recognition and a trained network. At the server 606, program listing data associated with Lost is retrieved 608. At the server 606, the second set-top box identifier 634 is queried against a database of known set-top box identifiers and it is identified that the second set-top box identifier 634 corresponds to the first set-top box identifier 652. The control command set associated with the first set-top box, which is stored at the server 606, is retrieved 636 and one or more commands to control the second set-top box 618 are identified 612 from the retrieved control command set. In this example, the commands required are those to control the set-top box such that it starts recording Channel 1 on Friday at 4:00 pm for one hour 214. The server 606 may access the appropriate control commands that enable the second smart speaker 600 to instruct the set-top box 618 to start recording Channel 1 on Friday at 4:00 pm for one hour. This may include codes to control the EPG, select different channels via the EPG, select different days and times via the EPG and record a selected program in the EPG. Once the appropriate infrared control codes are identified, they are transmitted via the communications network 604 to the smart speaker 600. At the smart speaker 600, the infrared control codes are transmitted 616 to the set-top box 618 via an infrared transmitter of the smart speaker 600. In another example, the set-top box may be capable of receiving control codes via Bluetooth and/or Wi-Fi. In this case, the smart speaker may transmit the codes to the set-top box via a Bluetooth transmitter and/or a Wi-Fi transmitter.

FIG. 7 is an exemplary data structure for indicating how commands are translated to commands that are receivable by a set-top box and how commands for different manufacturers and devices are stored, in accordance with some embodiments of the disclosure. The data structure 700 comprises set-top box manufacturers 702, set-top box identifiers 704, typical commands 706, associated infrared codes for controlling the set-top box 708 and an indicator of whether the commands are universal across all manufacturer devices 710.

For example, if a user wishes to record an episode of Lost on Channel 1, on Friday at 5:00 pm for one hour on a "StarPlay" set-top box, the smart speaker will need to transmit infrared codes to "Select the EPG," "Select channel" in the EPG, "Select day" in the EPG, "Select time" in the EPG, "Select the episode" of Lost in the EPG and "Select record." These infrared codes are stored and are associated with the "StarPlay" set-top boxes via the data structure. As the codes are universal, the same infrared codes are used for both the "123 STB" and the "AlphaOmega STB."

In another example, if a user wishes to record all episodes of Lost on Channel 1 on a "SunRecord" set-top box, the smart speaker will need to transmit infrared codes to "Select the EPG," "Select channel" in the EPG, "Select program" and "Select series record." These infrared codes are stored and are associated with the "SunRecord" set-top boxes via the data structure. As the codes for "Select the EPG," "Select channel," and "Select the program" are universal, the same infrared codes are used for both the "123 STB" and the "AlphaOmega STB." However, as the "Select series record" codes are not universal, different infrared codes will be stored and will be associated with the individual set-top boxes in the data structure.

In a further example, if a user wishes to record the current channel on a "UniversalShow" set-top box, the smart speaker will need to transmit infrared codes to "Start recording" and to "Stop recording." These infrared codes are stored and are associated with the "UniversalShow" set-top boxes via the data structure. As the "Start recording" and "Stop recording" codes are not universal, different infrared codes will be stored and will be associated with the individual set-top boxes in the data structure.

Some infrared codes may comprise, for example, repeatedly pressing a directional button, such as "Left," to select, for example, a channel, or a day in the EPG. A representation of a set-top box user interface may be stored at the server and may be used to determine the required control codes to complete an action, for example, by a trained network.

Figure 8:
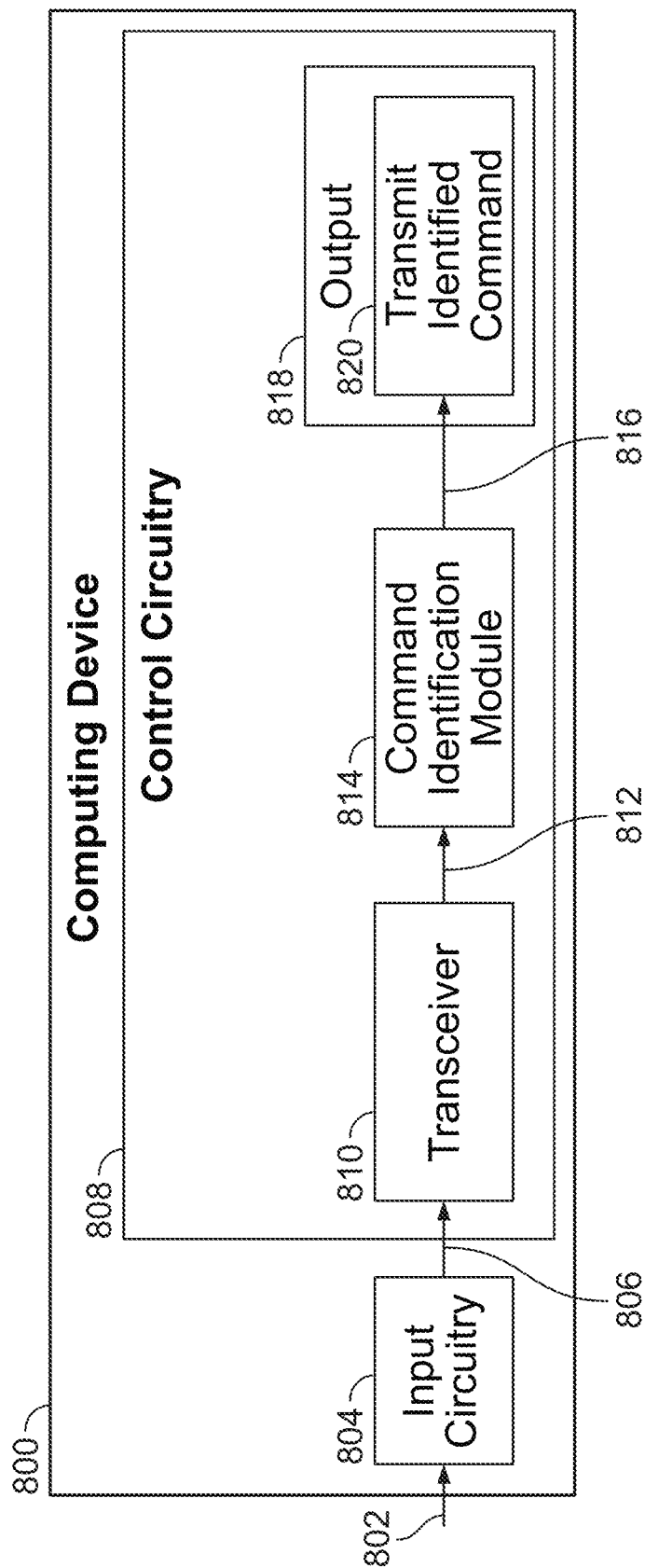
FIG. 8 is a block diagram representing components of a computing device and data flow therebetween for controlling a set-top box via a smart speaker, in accordance with some embodiments of the disclosure.

FIG. 8 is a block diagram representing components of a computing device and data flow therebetween for controlling a set-top box via a smart speaker, in accordance with some embodiments of the disclosure. Computing device 800 (e.g., a smart speaker 100, 200, 300, 400, 500, 600, 648 as discussed in connection with FIGS. 1-6) comprises input circuitry 804, control circuitry 808 and an output module 818. Control circuitry 808 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software.

A user provides an input 802 that is received by the input circuitry 804. The input circuitry 804 is configured to receive a user input related to a set-top box. Transmission of the input 802 from the input device to the input circuitry 804 may be accomplished via a microphone. The input may be verbal input, or it may be tactile input. The verbal input may be received by an integral microphone of the smart speaker or it may be received by an external microphone that is connected to the smart speaker by wired or wireless, for example BLUETOOTH, means. Tactile input includes, for example, input provided via buttons or a touchscreen at the smart speaker or via a keyboard and/or mouse connected to the smart speaker, for example via BLUETOOTH or a USB cable. The input circuitry 804 transmits 806 the user input to the control circuitry 808.

The control circuitry 808 comprises a transceiver 810, a command identification module 814 and an output module 818. The user input is transmitted to the transceiver 810. At the transceiver, a request, based on the user input 802, is transmitted via a communication network to a server. The communication network may comprise wired and/or wireless means, for example, the internet and/or a Wi-Fi network. At the server, program listing data is retrieved based on the request and is transmitted, via the communications network, to the transceiver 810. The program listing data is transmitted 812 to the command identification module 814 where, based on the program listing data, a command for controlling a set-top box is identified. The command is transmitted 816 to the output module 818. At 820 the identified command is transmitted to the set-top box, for example, by an infrared or a BLUETOOTH transmitter.

Figure 9:
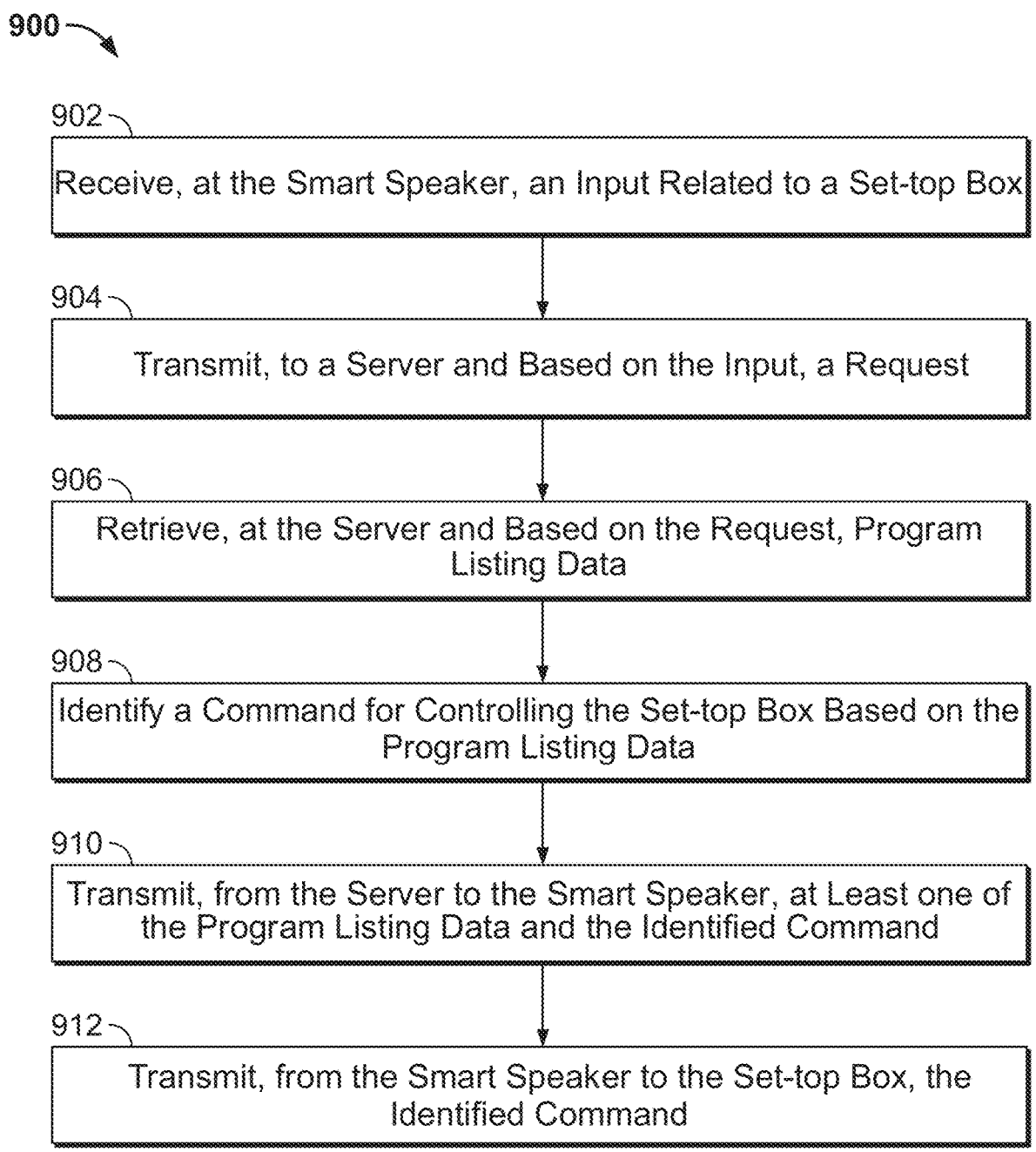
FIG. 9 is a flowchart representing a process for controlling a set-top box via a smart speaker, in accordance with some embodiments of the disclosure.

FIG. 9 is a flowchart representing a process for controlling a set-top box via a smart speaker, in accordance with some embodiments of the disclosure. Process 900 may be implemented on any aforementioned smart speaker 100, 200, 300, 400, 500, 600, 648. In addition, one or more actions of process 900 may be incorporated into or combined with one or more actions of any other process or embodiment described herein.

At 902, an input related to a set-top box is received at a smart speaker. At 904, a request, based on the input, is transmitted to a server. At 906, program listing data based on the request is retrieved at the server. At 908, a command for controlling the set-top box, based on the program listing data, is identified. At 910, at least one of the program listing data and the identified command is transmitted from the server to the smart speaker. At 912, the identified command is transmitted from the smart speaker to the set-top box.

Figure 10:
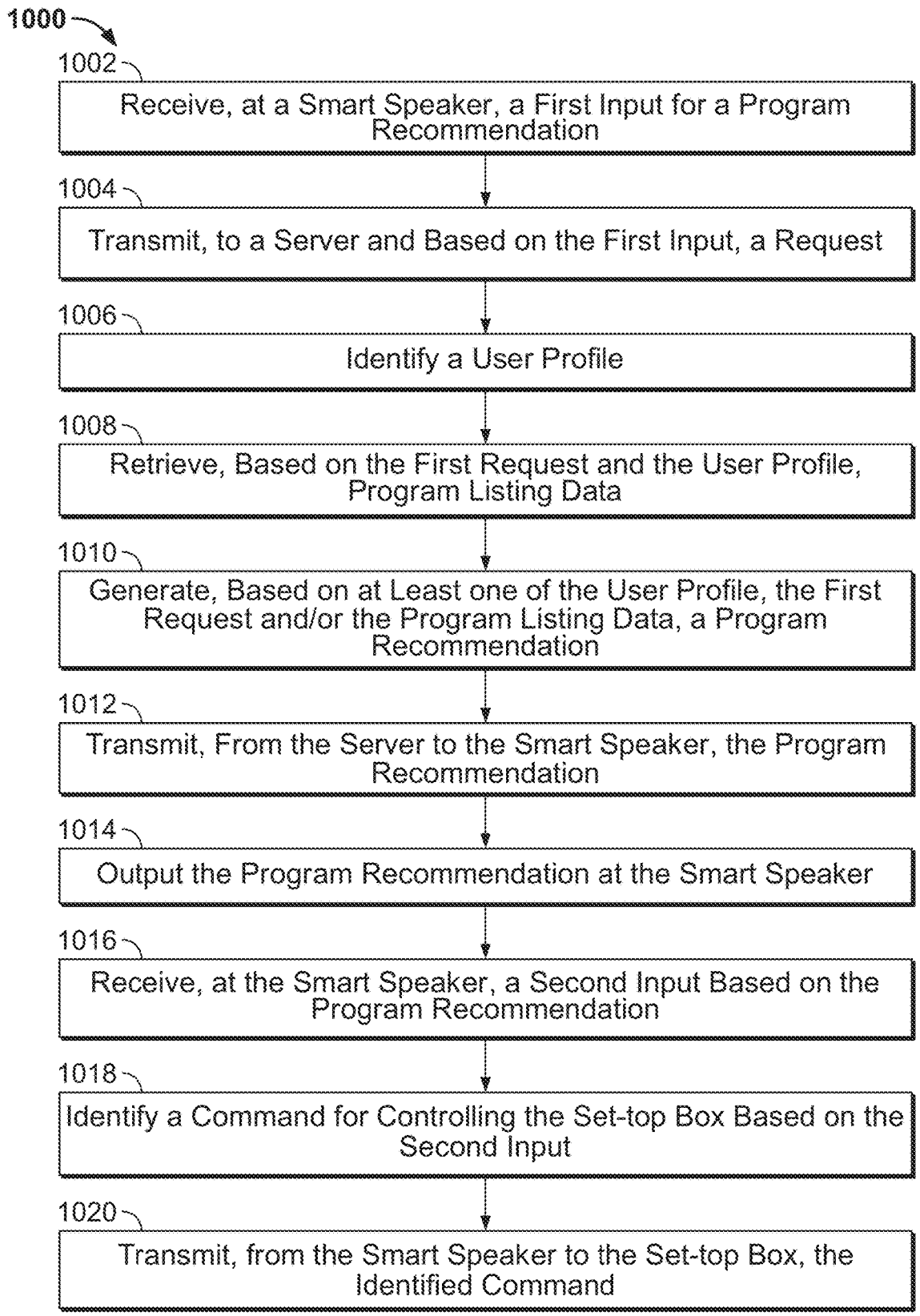
FIG. 10 is a flowchart representing a process for controlling a set-top box via a smart speaker, in accordance with some embodiments of the disclosure.

FIG. 10 is a flowchart representing a process for controlling a set-top box via a smart speaker, in accordance with some embodiments of the disclosure. Process 1000 may be implemented on any aforementioned smart speaker 100, 200, 300, 400, 500, 600, 648. In addition, one or more actions of process 1000 may be incorporated into or combined with one or more actions of any other process or embodiment described herein.

At 1002, a first input for a program recommendation is received at a smart speaker. At 1004, a request, based on the first input, is transmitted to a server. At 1006, a user profile is identified. At 1008, program listing data based on the first request and the user profile is retrieved at the server. At 1010 a program recommendation is generated based on at least one of the user profile, the first request and/or the program listing data. At 1012, the program recommendation is transmitted from the server to the smart speaker. At 1014, the program recommendation is outputted at the smart speaker. At 1016, a second input, based on the program recommendation, is received. At 1018, a command for controlling the set-top box, based on the second input, is identified. At 1020, the identified command is transmitted from the smart speaker to the set-top box.

Figure 11:
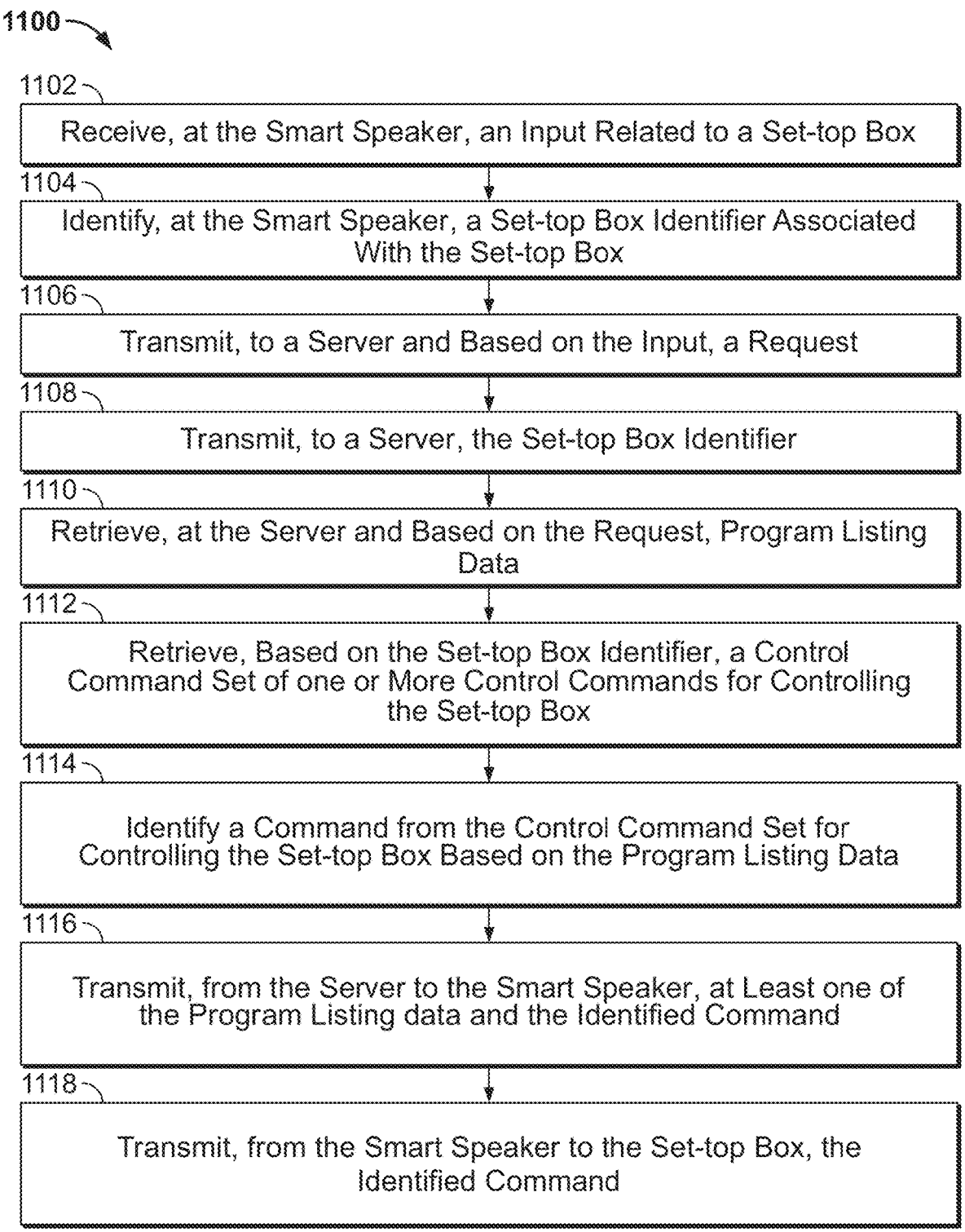
FIG. 11 is a flowchart representing a process for controlling a set-top box via a smart speaker, in accordance with some embodiments of the disclosure.

FIG. 11 is a flowchart representing a process for controlling a set-top box via a smart speaker, in accordance with some embodiments of the disclosure. Process 1100 may be implemented on any aforementioned smart speaker 100, 200, 300, 400, 500, 600, 648. In addition, one or more actions of process 1100 may be incorporated into or combined with one or more actions of any other process or embodiment described herein.

At 1102, an input related to a set-top box is received at a smart speaker. At 1104, a set-top box identifier associated with the set-top box is identified. At 1106, a request, based on the input, is transmitted to a server. At 1108, the set-top box identifier is transmitted to the server. At 1110, program listing data based on the request is retrieved at the server. At 1112, a control command set of one or more control commands for controlling the set-top box is identified based on the set-top box identifier. At 1114, a command for controlling the set-top box, based on the program listing data, is identified. At 1116, at least one of the program listing data and the identified command is transmitted from the server to the smart speaker. At 1118, the identified command is transmitted from the smart speaker to the set-top box.

Figure 12:
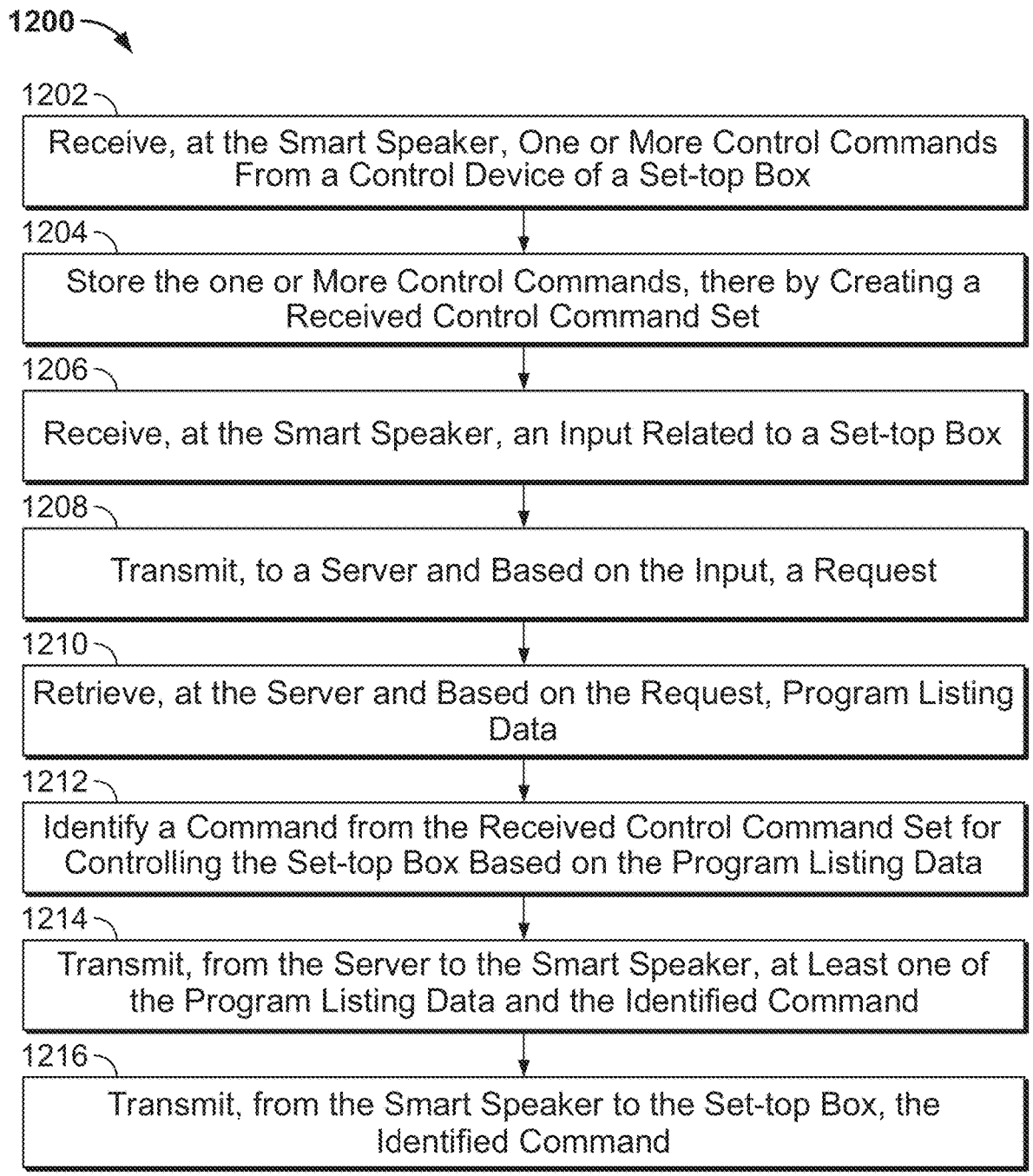
FIG. 12 is a flowchart representing a process for controlling a set-top box via a smart speaker, in accordance with some embodiments of the disclosure.

FIG. 12 is a flowchart representing a process for controlling a set-top box via a smart speaker, in accordance with some embodiments of the disclosure. Process 1200 may be implemented on any aforementioned smart speaker 100, 200, 300, 400, 500, 600, 648. In addition, one or more actions of process 1200 may be incorporated into or combined with one or more actions of any other process or embodiment described herein.

At 1202, one or more control commands from a control device of set-top box are received at a smart speaker. At 1204, one or more of the control commands are stored, thereby creating a received control command set. At 1206, an input related to a set-top box is received at the smart speaker. At 1208, a request, based on the input, is transmitted to a server. At 1210, program listing data based on the request is retrieved at the server. At 1212, a command, from the received command set, for controlling the set-top box and based on the program listing data, is identified. At 1214, at least one of the program listing data and the identified command is transmitted from the server to the smart speaker. At 1216, the identified command is transmitted from the smart speaker to the set-top box.

Figure 13:
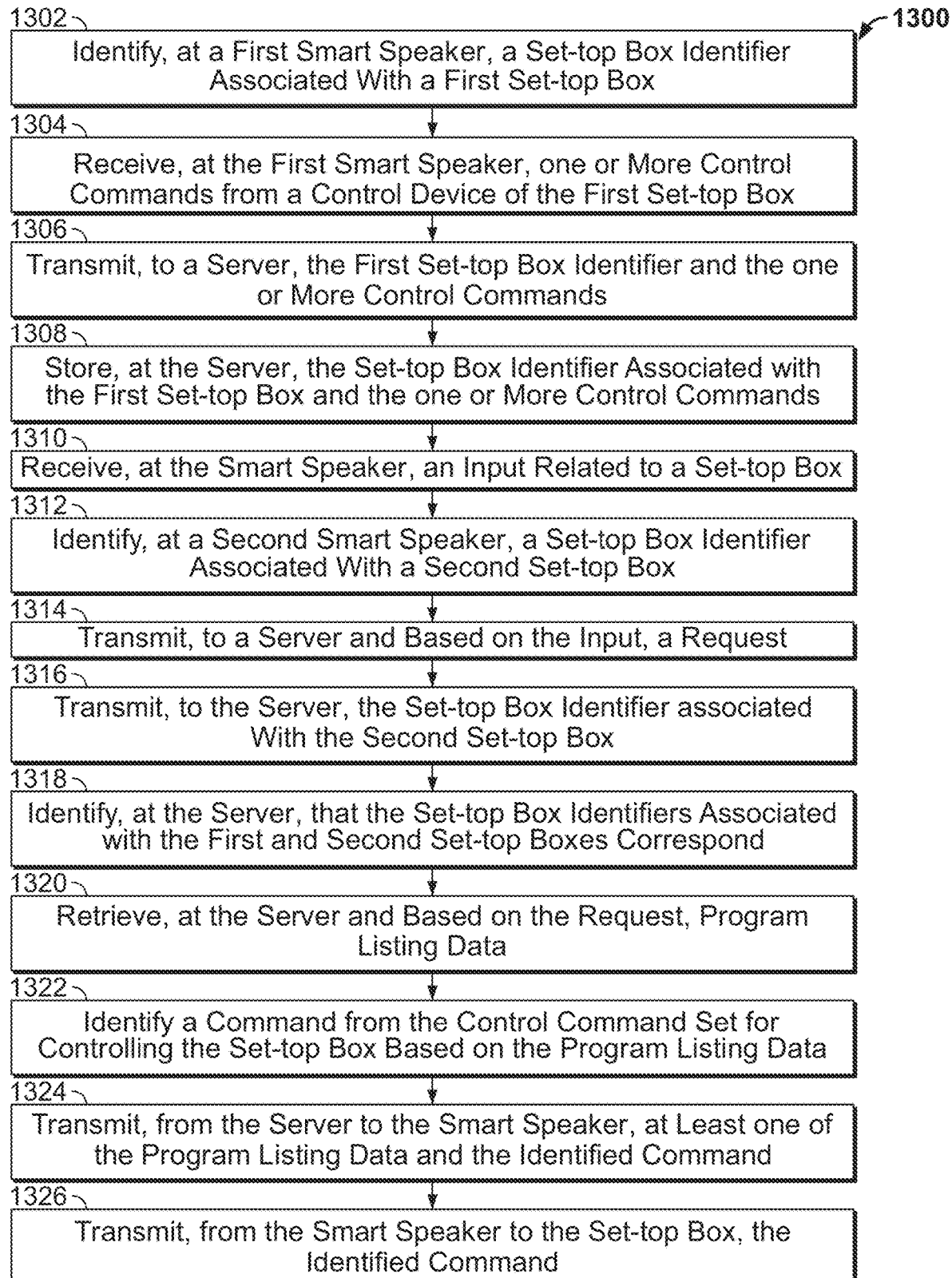
FIG. 13 is a flowchart representing a process for controlling a set-top box via a smart speaker, in accordance with some embodiments of the disclosure.

FIG. 13 is a flowchart representing a process for controlling a set-top box via a smart speaker, in accordance with some embodiments of the disclosure. Process 1300 may be implemented on any aforementioned smart speaker 100, 200, 300, 400, 500, 600, 648. In addition, one or more actions of process 1300 may be incorporated into or combined with one or more actions of any other process or embodiment described herein.

At 1302, a set-top box identifier associated with a first set-top box is identified at a first smart speaker. At 1304, one or more control commands from a control device of the first set-top box are received at the first smart speaker. At 1306, the first set-top box identifier and the one or more control commands are transmitted to a server. At 1308, the set-top box identifier associated with the first set-top box and the one or more control commands are stored at the server. At 1310, an input related to a set-top box is received at the smart speaker. At 1312, a set-top box identifier associated with a second set-top box is identified at a second smart speaker. At 1314, a request based on the input is transmitted to a server. At 1316, the set-top box identifier associated with the second set-top box is transmitted to the server. At 1318, that the set-top box identifiers associated with the first and second set-top boxes correspond is identified at the server. At 1320, program listing data based on the request is retrieved at the server. At 1322, a command from the control command set for controlling the set-top box based on the program listing data is identified. At 1324, at least one of the program listing data and the identified command is transmitted from the server to the smart speaker. At 1326, the identified command is transmitted from the smart speaker to the set-top box.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for controlling a set-top box via a smart speaker, the method comprising:
   receiving, at the smart speaker, an input related to the set-top box;
   transmitting, to a server, a request based on the input;
   retrieving, at the server and based on the request, program listing data;
   identifying a command for controlling the set-top box based on the program listing data;
   transmitting, from the server to the smart speaker, at least one of the program listing data and the identified command; and
   transmitting, from the smart speaker to the set-top box, the identified command;
   wherein the smart speaker is a first smart speaker, the set-top box is a first set-top box and the method further comprises:
   identifying, at a second smart speaker, a set-top box identifier associated with a second set-top box;
   receiving at the second smarts speaker, one or more control commands from a control device of the second set-top box;
   transmitting, to the server, the set-top box identifier associated with the second set-top box and the one or more control commands;
   storing, at the server, the set-top box identifier associated with the second set-top box and the one or more control commands, thereby creatin a received control command set;
   identifying, at a first smart speaker, a set-top box identifier associated with a first set-top box;
   transmitting, to the server, the set-top box identifier associated with the first set-top box; and
   identifying, at the server, that the set-top box identifier associated with the second set-top box corresponds to the set-top box identifier associated with the first set-top box; and
   wherein:
   identifying the command comprises identifying a control command from the control command set;
   transmitting the identified command from the server comprises transmitting the control command from the control command set; and
   transmitting the identified command from the first smart speaker to the first set-top box comprises transmitting the control command from the control command set.

2. The method of claim 1, wherein:
   the input is a first input and is for a program recommendation;
   the request is a first request and is based on the first input;
   a user profile is identified;
   the program listing data is retrieved based on the first request and the user profile;
   a program recommendation is generated, at the server, based on at least one of the user profile, the first request and/or the program listing data;
   the program recommendation is transmitted, from the server, to the smart speaker;
   the program recommendation is outputted at the smart speaker;
   a second input related to the program recommendation and the set-top box is received at the smart speaker; and
   the command for controlling the set-top box is identified based on the second input.

3. The method of claim 1, wherein:
   the program listing data is transmitted from the server to the smart speaker; and the command is identified at the smart speaker.

4. The method of claim 1, wherein:
   the command is identified at the server; and
   the command is transmitted from the server to the smart speaker.

5. The method of claim 1, wherein the method further comprises:
   identifying, at the smart speaker, a set-top box identifier associated with the set-top box;
   transmitting, to a server, the set-top box identifier;
   retrieving, at the server and based on the set-top box identifier, a control command set of one or more control commands for controlling the set-top box; and
   wherein:
   the identifying the command based on the program listing data comprises identifying a control command from the control command set;
   the transmitting the command from the server to the smart speaker comprises transmitting the identified control command; and
   the transmitting the command from the smart speaker to the set-top box comprises transmitting the identified control command from the control command set.

6. The method of claim 1, wherein the method further comprises:
   receiving, at the smart speaker, one or more control commands from a control device of the set-top box;
   storing the one or more control commands, thereby creating a received control command set; and
   wherein:
   the identifying the command based on the program listing data comprises
   identifying a control command from the received control command set; and
   the transmitting the command from the smart speaker to the set-top box comprises transmitting the identified control command from the received control command set.

7. The method of claim 1, wherein the command is received via a microphone of the smart speaker.

8. The method of claim 1, wherein the command is transmitted from the smart speaker to the set-top box via an infrared transmitter or a Bluetooth transmitter.

9. The method of claim 1, wherein the program listing data comprises one or more of date, time and/or channel information for a television program and/or a movie.

10. A system for controlling a set-top box via a smart speaker, the system comprising:
a communication port; and
control circuitry configured to:
receive, at the smart speaker, an input related to the set-top box;
transmit, to a server, a request based on the input;
retrieve, at the server and based on the request, program listing data;
identity a command for controlling the set-top box based on the program listing data;
transmit, from the server to the smart speaker, at least one of the program listing data and the identified command; and
transmit, from the smart speaker to the set-top box, the identified command;
wherein the smart speaker is a first smart speaker, the set-top box is a first set-top box and the control circuitry is further configured to:
identify, at a second smart speaker, a set-top box identifier associated with a second set-top box;
receive, at the second smart speaker, one or more control commands from a control device of the second set-top box;
transmit, to the server, the set-top box identifier associated with the second set-top box and the one or more control commands;
store, at the server, the set-top box identifier associated with the second set-top box and the one or more control commands, thereby creating a received control command set:
identify, at a first smart speaker, a set-top box identifier associated with a first set-top box;
transmit to the server the set-top box identifier associated with the first set-top box; and
identify, at the server, that the set-top box identifier associated with the second set-top box corresponds to the set-tors box identifier associated with the first set-top box; and
wherein:
the control circuitry configured to identify the command is further configured to identify a control command from the control command set;
the control circuitry configured to transmit the identified command from the server is further configured to transmit the control command from the control command set; and
the control circuitry configured to transmit the identified command from the first smart speaker to the first set-top box is further configured to transmit the control command from the control command set.

11. The system of claim 10, wherein:
the input is a first input and is for a program recommendation;
the request is a first request and is based on the first input;
the control circuitry is further configured to identify a user profile;
the control circuitry configured to retrieve the program listing data is further configured to retrieve the program listing based on the first request and the user profile;
the control circuitry is further configured to generate a program recommendation, at the server, based on at least one of the user profile, the first request and/or the program listing data; and
the control circuitry is further configured to:
transmit the program recommendation, from the server, to the smart speaker; output the program recommendation at the smart speaker; and
receive a second input related to the program recommendation and the set-top box at the smart speaker; and
the control circuitry configured to identify the command for controlling the set-top box is further configured to identify the command based on the second input.

12. The system of claim 10, wherein the control circuitry is further configured to:
transmit the program listing data from the server to the smart speaker; and identify the command at the smart speaker.

13. The system of claim 10, wherein the control circuitry is further configured to:
identify the command at the server; and
transmit the command from the server to the smart speaker.

14. The system of claim 10, wherein the control circuitry is further configured to:
identify, at the smart speaker, a set-top box identifier associated with the set-top box;
transmit, to a server, the set-top box identifier;
retrieve, at the server and based on the set-top box identifier, a control command set of one or more control commands for controlling the set-top box; and
wherein:
the control circuitry configured to identify the command based on the program listing data is further configured to identify a control command from the control command set;
the control circuitry configured to transmit the command, from the server to the smart speaker, is further configured to transmit the identified control command from the control command set; and
the control circuitry configured to transmit the command, from the smart speaker to the set-top box, is further configured to transmit the identified control command from the control command set.

15. The system of claim 10, wherein the control circuitry is further configured to:
receive, at the smart speaker, one or more control commands from a control device of the set-top box;
store the one or more control commands, thereby creating a received control command set; and
wherein:
the control circuitry configured to identify the command based on the program listing data is further configured to identify a control command from the received control command set; and
the control circuitry configured to transmit the command from the smart speaker to the set-top box is further configured to transmit the identified control command from the received control command set.

16. The system of claim 10, wherein the control circuitry is further configured to receive the command via a microphone of the smart speaker.

17. The system of claim 10, wherein the control circuitry is further configured to transmit the command from the smart speaker to the set-top box via an infrared transmitter or a Bluetooth transmitter.

18. The system of claim 10, wherein the control circuitry configured to retrieve the program listing data is further configured to retrieve program listing data comprising one or more of date, time and/or channel information for a television program and/or a movie.

\* \* \* \* \*

UNITED STATES PATENT AND TRADEMARK OFFICE
CERTIFICATE OF CORRECTION

PATENT NO. : 11,166,063 B1
APPLICATION NO. : 17/115332
DATED : November 2, 2021
INVENTOR(S) : Keiichi Den Page 1 of 1

It is certified that error appears in the above-identified patent and that said Letters Patent is hereby corrected as shown below:

In the Claims

In Claim 1, Line 20, at Column 15, Line 41, delete "smarts" and insert --smart--.

In Claim 1, Line 28, at Column 15, Line 49, delete "creatin" and insert --creating--.

In Claim 10, Line 10, at Column 17, Line 10, delete "identity" and insert --identify--.

In Claim 10, Line 32, at Column 17, Line 32, delete "set:" and insert --set;--.

In Claim 10, Line 35, at Column 17, Line 35, delete "transmit to the server" and insert --transmit, to the server,--.

In Claim 10, Line 40, at Column 17, Line 40, delete "set-tors" and insert --set-top--.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*